United States Patent [19]
Yoshizawa et al.

[11] 3,911,212
[45] Oct. 7, 1975

[54] THRESHOLD DEVICE FOR CONVERTING VIDEO SIGNAL TO BINARY VIDEO SIGNALS AND METHOD OF DETERMINING THRESHOLD LEVEL

[75] Inventors: Kiyoshi Yoshizawa, Musashino; Kiichi Yamaya, Kyoba, both of Japan

[73] Assignee: Toyo Ink Manufacturing Co., Ltd., Kyoba, Japan

[22] Filed: July 30, 1974

[21] Appl. No.: 492,996

[52] U.S. Cl. ................ 178/6.8; 178/6; 178/DIG. 1; 178/DIG. 4; 178/DIG. 35; 340/146.3 AG

[51] Int. Cl.[2] ........................................... H04H 7/02

[58] Field of Search .... 178/6, 6.8, DIG. 4, DIG. 37, 178/DIG. 36, DIG. 34, DIG. 1; 340/146.3 AE, 146.3 AG

*Primary Examiner*—Robert L. Griffin
*Assistant Examiner*—Edward L. Coles
*Attorney, Agent, or Firm*—Sughrue, Rothwell, Mion, Zinn & Macpeak

[57] ABSTRACT

In an image analysis for document or a particle measuring system, a threshold circuit for providing a reference signal for comparison with a video signal derived from a television camera to provide a corresponding binary video signal. A monitoring device is provided for displaying on the screen two sample marks as well as an image of the character or particle being scanned. The two sample marks are position-shiftable on the screen so that they are shifted to the highest and lowest image intensity portions on the screen, respectively. The threshold circuit operates to sample and hold the video signal at those points of time corresponding to the two sample marks to provide the reference signal equal to the average of the sample values.

4 Claims, 3 Drawing Figures

THRESHOLD DEVICE FOR CONVERTING VIDEO SIGNAL TO BINARY VIDEO SIGNALS AND METHOD OF DETERMINING THRESHOLD LEVEL

BACKGROUND OF THE INVENTION

This invention relates to a threshold device for converting a video signal into a binary video signal and a method of determining a reference threshold against which such video signal is compared to provide the corresponding binary output. This invention finds particular utility in an image analysis for document or a particle measuring system where a particular sample is measured by operating on a video signal derived from a television camera which scans the sample.

SUMMARY OF THE INVENTION

It is a primary object of the present invention to provide am improved threshold circuit for use in an image analysis for document or a particle measuring system which employs a scanning device, which will convert a video signal derived from the scanning device into a binary video signal.

It is another object of the present invention to provide a threshold circuit having a variable threshold against which a video signal derived from a scanning device is compared to provide a corresponding binary video signal.

It is a further object of the present invention to provide a threshold circuit which will yield satisfactory results regardless of the relative shading of the object or background and the intensity of illumination directed onto the object.

It is still another object of the present invention to provide a threshold circuit for use in a particle measuring system, which will permit precise determination of the location of the boundaries of the objects being scanned and measured.

In accordance with the present invention, a threshold circuit is provided in which a video signal derived from a television camera is compared with a reference threshold determined in accordance with actual reflectance characteristics of an object being scanned and its background which appear on a monitoring screen. Two position-shiftable sample marks are also provided on the monitoring screen, one of which is adjustably shifted to the highest image intensity portion and the other of which is adjustably shifted to the lowest image intensity portion. The threshold circuit operates to sample and hold the video signal at those points of time corresponding to the two sample marks on the screen, the sampled values of the video signal being processed to provide the reference threshold which is equal to the average of the sampled values. Binary video transitions occur at the reference threshold level thus determined.

Examples of the objects to be measured or recognized according to the teachings of the present invention include documents, photographs, microscopic structure of metal, fine particles, micro-organisms on a filter paper, etc.

DETAILED DESCRIPTION OF THE PREFERRED EMBODIMENTS

Figure 1:
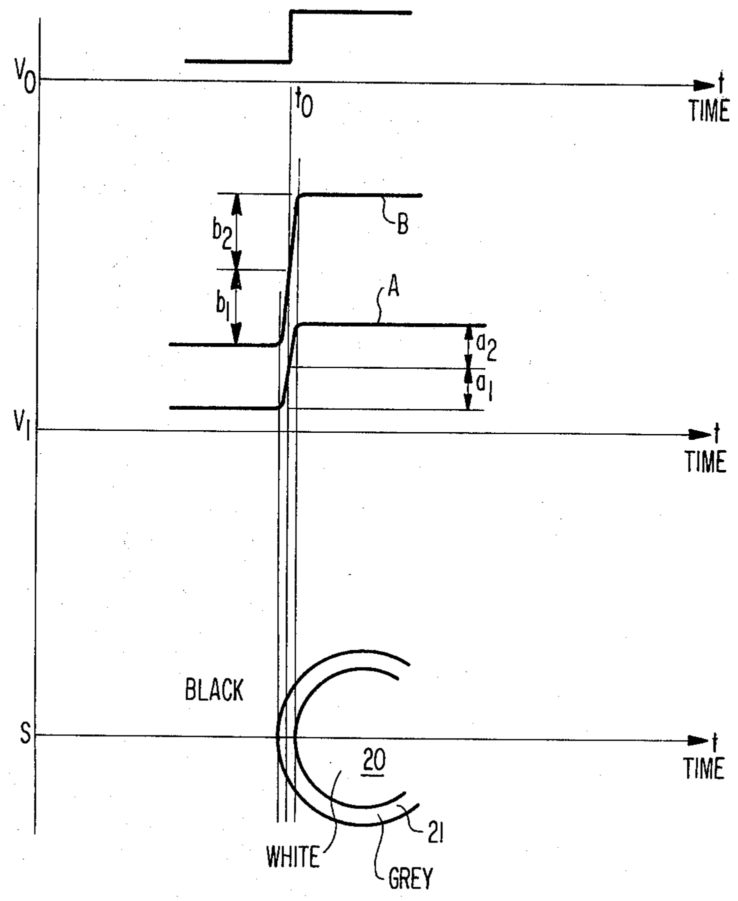
FIG. 1 is a time-based plot of the video and banary video signals developed by scanning the illustrated "white" dot on a "black" backgound.

Referring now to FIG. 1, the relationship of video signals and the object from which they are derived is illustrated. For the sake of simplicity, it is assumed that the object to be scanned by a television camera 1 (see FIG. 2) is a white dot 20 on a black background. The video signal $V_1$ developed by the television camera 1 is shown as solid lines A and B and is derived by the traverse along a scan line S across the dot 20. Curve A corresponds to the video signal derived under weak illumination and curve B corresponds to the video signal obtained under heavy illumination. It should be noted that the transitions of the video signals A and B are not sharp, but instead are sloped because of a grey portion 21 surrounding the white dot 20. The purpose of the threshold device of this invention is to detect that point on the slope of video signals A and B which corresponds to the actual dot boundary, and to produce a binary video signal, indicated at $V_0$, having sharp transitions occurring at the boundary points. In curves A and B, $a_1$ and $b_1$ designate the amplitude ranges within which the video signal is recognized to be at the black level, while $a_2$ and $b_2$ indicate the ranges within which the video signal is recognized to be at the white level. Since, as illustrated in FIG. 1, the level of the video signal $V_1$ varies from the curve A to curve B with the increase of the intensity of illumination directed onto the object to be scanned, it will be appreciated that reliable detection of the object requires various thresholds rather than fixed thresholds.

Figure 2:
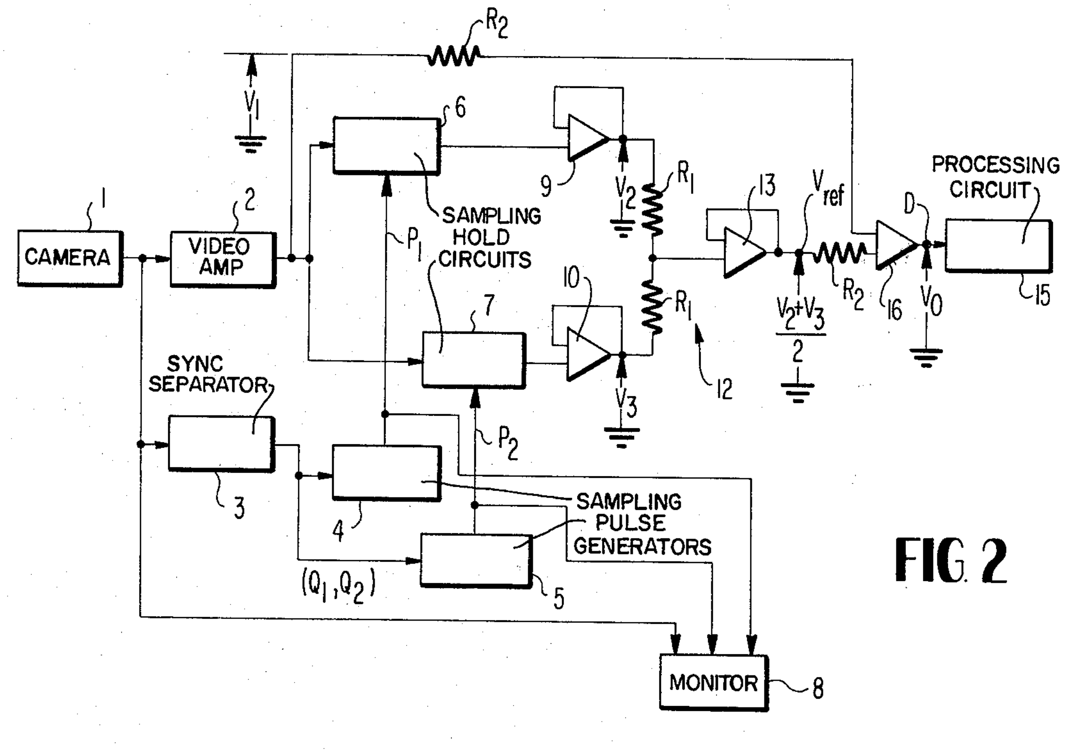
FIG. 2 is a block diagram of a system embodying the present invention.

FIG. 2 is a block diagram of a typical example of the threshold circuit according to the present invention. The function of this circuit is to develop a binary video signal having transition points which substantially coincide with the traverse of the object boundaries by the television camera 1. The video signal produced by the camera 1 is fed to a video amplifier 2 and also to a sync separator circuit 3. Sampling pulse generator circuits 4 and 5 are connected to the sync separator circuit 3 so as to be supplied with separated horizontal and vertical sync signals $Q_1$ and $Q_2$ therefrom. The sampling pulse generators 4 and 5 include delay circuits for delaying the sync signals $Q_1$ and $Q_2$ to provide sampling pulses $P_1$ and $P_2$. These sampling pulses $P_1$ and $P_2$ are fed to sampling hold circuits 6 and 7 which serve to sample and hold the amplified video signal in response to the sampling pulses $P_1$ and $P_2$. A monitoring display device 8, such as an industrial television receiver, is connected to the television camera 1 and also to the sampling pulse generators 4 and 5 to display the object on the screen for puroses to be described later. The respective output of the sampling hold circuits 6 and 7 are fed to buffer amplifiers 9 and 10 to produce output voltages $V_2$ and $V_3$, respectively. The output voltages $V_2$ and $V_3$ are then passed to a summing network 12 which determines the average of the output voltages $V_2$ and $V_3$. As shown, the summing network 12 comprises a pair of resistors having the same resistance $R_1$, and a buffer amplifier 13. It is this voltage output by the summing network 12 which is used to determine the threshold level for a comparator 14. The other input to the comparator 14 is supplied through a resistor $R_2$ from the output of the amplifier 2, so that the amplified video signal is compared with the threshold voltage. The comparator 14, consequently, switches whenever the amplified video signal crosses the midpoint determined by the average of the output voltages $V_2$ and $V_3$. The binary video signal produced by the switching action of the comparator 14 is fed to an operation processing circuit 15.

Figure 3:
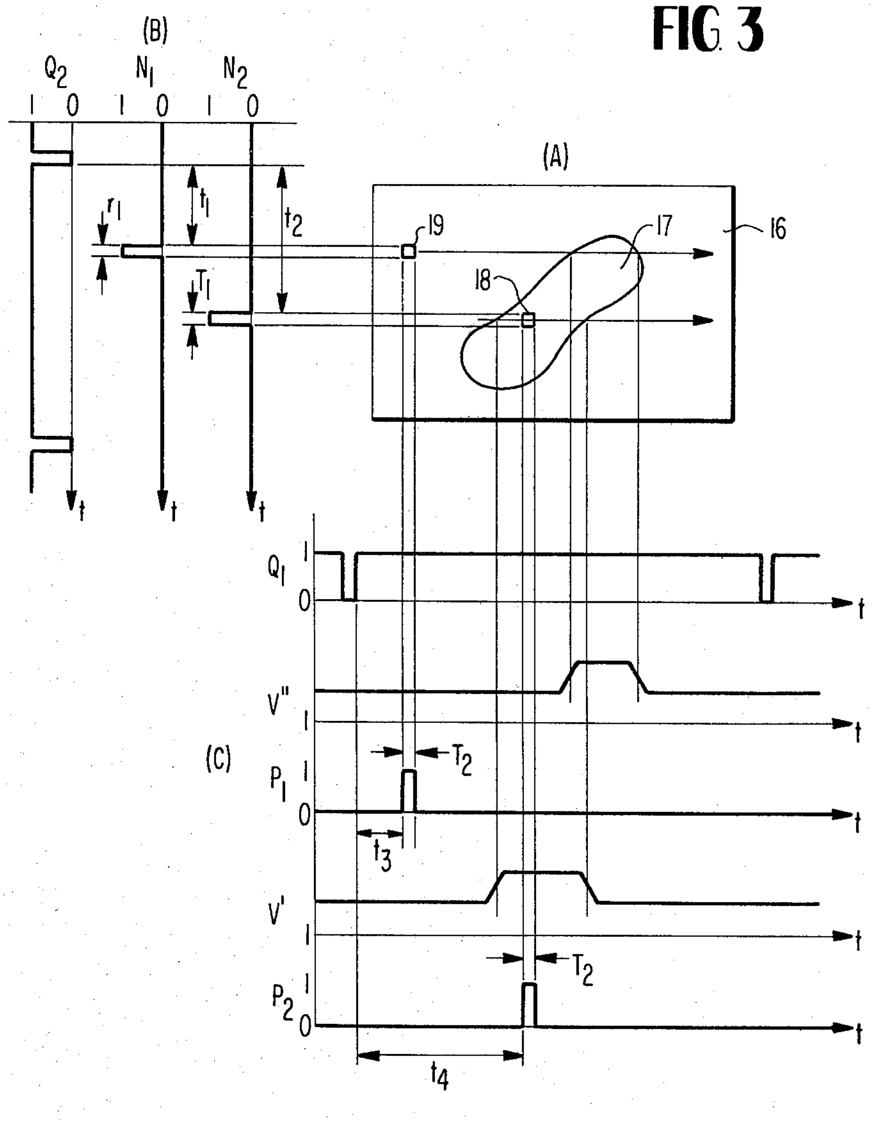
FIG. 3 is a schematic view useful in explaining the operation of the system shown in FIG. 2.

An understanding of the operation of the threshold device will be enhanced by reference to FIG. 3 wherein the relationship of the sampling pulses $P_1$ and $P_2$ with respect to $Q_1$ and $Q_2$ is illustrated. Designated by 16 is the monitoring screen of the display device 8 on which there appear two sample marks 18 and 19 together with the image of the object 17 being scanned. These sample marks have a very small area determined by the width $T_2$ of the sampling pulses $P_1$ and $P_2$. As schematically shown in FIG. 3(C), the sampling pulses $P_1$ and $P_2$ are delayed versions of the horizontal sync signal $Q_1$, although they are inverted. More particularly, the horinzontal sync signal is delayed for $t_3$ and $t_4$ by the delay circuits in the sampling pulse generators 4 and 5 in order to produce the sampling pulses $P_1$ and $P_2$. The vertical positions of the sample marks 18 and 19 are determined by their associated sampling pulses $N_1$ and $N_2$ having an identical width $T_1$, these pulses being provided by delaying the vertical sync signal $Q_2$ for the respective periods $t_1$ and $t_2$, as shown in FIG. 3(B). The sampling pulse generators 4 and 5 can be adjusted to vary the delay time $t_1$ to $t_4$ so as to shift the positions of the two sample marks 18 and 19 as desired. One of the sample marks 18 is shifted to the highest image intensity portion, that is, the object portion, and the other sample mark 19 is shifted to the lowest image intensity portion, that is, the background portion, as shown in FIG. 3(A). It is important that the sample marks 18 and 19 be of such brightness that they can be distinguished from the white or relatively light portions on the screen. FIG. 3(C) shows the time relationship between the sampling pulses $P_1$, $P_2$ and the video signals $V'_1$, $V''_2$ obtained during the corresponding scanning intervals.

In the operation of the threshold device as described above, the object to be measured or recoginized is scanned by the television camera 1 to provide the video signal representing the quantity and/or physical parameters or the identity of the object. On the monitoring screen there appear the two sample marks 18 and 19 as well as the image of the object being scanned. By a proper adjustment of the delay circuits provided in the sampling pulse generators 4 and 5, one of the sample marks is shifted to the highest image intensity portion and the other sample mark is shifted to the lowest image intensity portion. In the illustrated embodiment, the sample mark 18 is on the white or relatively light particle, while the sample mark 19 is on the black or relatively dark background. Shifting of the two sample marks will cause the threshold circuit to sample the video signal at those points of time corresponding to the two sample marks 18 and 19. The sampled values of the video signal are supplied to the summing network 12 to determined the reference voltage level $V_{ref}$ which is equal to the average of the sampled values. The reference voltage $V_{ref}$ is given as follows:

$$V_{ref} = V_3 + \frac{V_2 - V_3}{2R_1} \cdot R_1 = \frac{V_2 + V_3}{2} \qquad (1)$$

The voltage $V_{ref}$ is supplied to the positive input terminal of the comparator 14 through a resistor $R_2$. Supplied to negative input terminal of the comparator 14 through a resistor $R_2$ is the amplified video signal $V_1$. Thus, it will be appreciated that the voltage $V_{ref}$ is used to establish the threshold level for the comparator 14. For example, the comparator 14 provides a logical "1" output when $V_1 \geqq V_{ref}$ and a logical "0" output when $V_1 < V_{ref}$. The logical video signal $V_o$ obtained is then supplied to the following operation processing circuit 15. As is apparent from Equation (1), the threshold level in the comparator 14 corresponds to the average of the white or light level and the black or shade level sampled in response to the sampling pulses $P_1$ and $P_2$. Accordingly, the comparator 14 provides a binary video $V_0$ obtained as a result of comparison with the mean value between the white or light level and the black or shade level.

As has been described above, this invention provides an improved threshold device for use in an image analysis for document or a particle measuring system, which permits reliable and precise conversion of a video signal into a binary video signal. Since the reference level varies depending upon the relative shading or contrast between objects and their background and the intensity of illumination directed onto the objects, this invention does not require a rigid specification of useable charcter and sheet qualities, which would reduce the cost of machine readable documents. When employed in a particle measuring system, the threshold device of this invention provides a binary video signal having transitions occurring substantially at each boundary point of the object being measured.

While, in the illustrated embodiment, three buffer amplifiers 9, 10 and 13 are used for obtaining the reference voltage $V_{ref}$, it should be understood that it may be possible to employ arithmetic circuits such as adders and dividers. Further a Schmitt circuit can be used instead of the comparator 14.

What is claimed is:

1. A threshold device for converting a video signal derived from a television camera into a corresponding binary signal, comprising:

a sync signal separator responsive to said video signal for deriving sync signals;

a first sampling pulse generator responsive to said derived sync signals for generating a first sampling pulse;

a second sampling pulse generator responsive to said derived sync signals for generating a second sampling pulse;

a first sample hold circuit for sampling and holding said video signal in response to said first sampling pulse;

a second sample hold circuit for sampling and holding said video signal in response to said second sampling pulse;

a summing network responsive to said first and second sample hold circuit for providing a reference signal equal to the average of the sampled values of said video signal;

a comparator responsive to said video and said reference signal for providing a binary video signal depending upon whether said video signal is larger than said reference signal; and a television monitor having a screen and responsive to said video signal for displaying an image of the object scanned by said television camera means being responsive to the sample pulse generator, to provide first and second sample marks on the screen at positions corresponding to said first and second sampling pulses;

said first and second sampling pulse generators having adjustment means to vary the positions of said first and second sample marks on the screen so that said first and second sample marks are shifted to the highest and lowest image intensity portions on the screen, respectively.

2. A threshold device according to claim 1, in which said first and second sampling pulse generators include delay circuits for providing variable time delay to said derived sync signals.

3. A threshold device according to claim 1, in which said summing network includes first and second buffer amplifiers responsive to the sampled video signals from said first and second sample hold circuits, respectively; first and second resistors having identical resistance and connected at their respective one ends to the outputs of said first and second buffer amplifiers; and a third buffer amplifier connected at its input to the other ends of said first and second resistors, the output of said third buffer amplifier being connected to said comparator.

4. A method of determining a reference threshold against which a video signal derived from a television camera is compared to provide a corresponding binary video signal, comprising the steps of:

displaying on a monitoring screen an image of the object being scanned by said television camera and two sample marks, each of said sample marks having a distinguishable brightness and being shiftable to an arbitrary point on said screen;

shifting one of said two sample marks into a high image intensity region and the other into a low image intensity region on said screen;

sampling said video signal at those points of time corresponding to said two sample marks; and averaging the sampled values of said video signals to provide said reference threshold.

* * * * *

UNITED STATES PATENT AND TRADEMARK OFFICE

CERTIFICATE OF CORRECTION

PATENT NO. : 3,911,212

DATED : October 8, 1975

INVENTOR(S) : Kiyoshi YOSHIZAWA, and Kiichi YAMAYA

It is certified that error appears in the above-identified patent and that said Letters Patent are hereby corrected as shown below:

IN THE HEADING:

Assignee: "Toyo Ink Manufacturing Co., Ltd." should also include --Nihon Regulator Co., Ltd.--

Signed and Sealed this

*thirteenth* Day of *April 1976*

[SEAL]

*Attest:*

RUTH C. MASON
*Attesting Officer*

C. MARSHALL DANN
*Commissioner of Patents and Trademarks*